United States Patent
Taylor et al.

(10) Patent No.: US 8,943,197 B1
(45) Date of Patent: Jan. 27, 2015

(54) AUTOMATED CONTENT UPDATE NOTIFICATION

(75) Inventors: Brett R. Taylor, Bainbridge Island, WA (US); Ameet N. Vaswani, Seattle, WA (US); Faizal S. Kassamali, Kirkland, WA (US); Ryan Tucker, Shoreline, WA (US); Michael V. Zampani, Seattle, WA (US); Ranganath Atreya, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 204 days.

(21) Appl. No.: 13/587,867

(22) Filed: Aug. 16, 2012

(51) Int. Cl.
*G06F 15/16* (2006.01)
*G06F 15/173* (2006.01)

(52) U.S. Cl.
USPC ............ 709/224; 715/208; 715/234; 715/861

(58) Field of Classification Search
CPC ... H04L 29/08072; H04L 29/06; H04L 43/00; H04L 12/2602; H04L 41/22
USPC ........................................................ 709/224
See application file for complete search history.

(56) References Cited

U.S. PATENT DOCUMENTS

| | | | |
|---|---|---|---|
| 5,634,064 | A | 5/1997 | Warnock et al. |
| 5,872,850 | A | 2/1999 | Klein et al. |
| 5,961,593 | A | 10/1999 | Gabber et al. |
| 6,049,812 | A | 4/2000 | Bertram et al. |
| 6,108,637 | A | 8/2000 | Blumenau |
| 6,138,156 | A | 10/2000 | Fletcher et al. |
| 6,195,679 | B1 | 2/2001 | Bauersfeld et al. |
| 6,430,624 | B1 | 8/2002 | Jamtgaard et al. |
| 6,549,941 | B1 | 4/2003 | Jaquith et al. |
| 6,560,620 | B1 | 5/2003 | Ching |
| 6,625,624 | B1 | 9/2003 | Chen et al. |
| 6,704,024 | B2 | 3/2004 | Robotham et al. |
| 6,785,864 | B1 * | 8/2004 | Te et al. ........................ 715/205 |
| 6,871,236 | B2 | 3/2005 | Fishman et al. |

(Continued)

FOREIGN PATENT DOCUMENTS

WO    WO 2013/003631 A2    1/2013

OTHER PUBLICATIONS

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

(Continued)

*Primary Examiner* — Tauqir Hussain
(74) *Attorney, Agent, or Firm* — Knobbe, Martens, Olson & Bear, LLP (57) ABSTRACT

Features are disclosed for detecting meaningful updates to network accessible content, including but not limited to web pages. The portion or portions of content that are meaningful can be automatically determined based on a previously defined content profile, an analysis of user interactions with the content, algorithms and automated content analysis techniques, some combination thereof, or other techniques. Content can be monitored and determinations can be made regarding whether and to what extent the content has changed. Client devices or users thereof may be notified of detected meaningful content updates. Notifications can include updated portions of the content. The updated content may be displayed to the user on a client device, and visual treatments may be applied to the updated portions to draw the users' attention to the presence and substance of the updates.

29 Claims, 6 Drawing Sheets

(56) References Cited

U.S. PATENT DOCUMENTS

| | | | |
|---|---|---|---|
| 6,944,665 B2 | 9/2005 | Brown et al. | |
| 6,963,850 B1 | 11/2005 | Bezos et al. | |
| 7,003,442 B1 | 2/2006 | Tsuda | |
| 7,051,084 B1 | 5/2006 | Hayton et al. | |
| 7,054,952 B1 | 5/2006 | Schwerdtfeger et al. | |
| 7,085,736 B2 | 8/2006 | Keezer et al. | |
| 7,159,023 B2 | 1/2007 | Tufts | |
| 7,171,478 B2 | 1/2007 | Lueckhoff et al. | |
| 7,191,211 B2 | 3/2007 | Tuli | |
| 7,353,252 B1 | 4/2008 | Yang et al. | |
| 7,373,313 B1 | 5/2008 | Kahle et al. | |
| 7,543,059 B2 | 6/2009 | Johnson et al. | |
| 7,792,944 B2 | 9/2010 | DeSantis et al. | |
| 7,797,421 B1* | 9/2010 | Scofield et al. | 709/224 |
| 7,831,582 B1 | 11/2010 | Scofield et al. | |
| 7,945,637 B2 | 5/2011 | Van Vleet et al. | |
| 7,966,395 B1* | 6/2011 | Pope et al. | 709/224 |
| 7,975,000 B2 | 7/2011 | Dixon et al. | |
| 7,996,912 B2 | 8/2011 | Spalink et al. | |
| 8,010,545 B2 | 8/2011 | Stefik et al. | |
| 8,015,496 B1 | 9/2011 | Rogers | |
| 8,046,435 B1* | 10/2011 | Parekh et al. | 709/219 |
| 8,060,463 B1 | 11/2011 | Spiegel | |
| 8,073,850 B1 | 12/2011 | Hubbard et al. | |
| 8,103,742 B1 | 1/2012 | Green | |
| 8,185,621 B2 | 5/2012 | Kasha | |
| 8,249,904 B1 | 8/2012 | Desantis et al. | |
| 8,271,887 B2 | 9/2012 | Offer et al. | |
| 8,316,124 B1 | 11/2012 | Baumback et al. | |
| 8,336,049 B2 | 12/2012 | Medovich | |
| 2001/0039490 A1 | 11/2001 | Verbitsky et al. | |
| 2002/0030703 A1 | 3/2002 | Robertson et al. | |
| 2002/0194302 A1 | 12/2002 | Blumberg | |
| 2003/0023712 A1 | 1/2003 | Zhao et al. | |
| 2003/0041106 A1 | 2/2003 | Tuli | |
| 2004/0083294 A1 | 4/2004 | Lewis | |
| 2004/0139208 A1 | 7/2004 | Tuli | |
| 2004/0181613 A1 | 9/2004 | Hashimoto et al. | |
| 2004/0205448 A1 | 10/2004 | Grefenstette et al. | |
| 2004/0220905 A1 | 11/2004 | Chen et al. | |
| 2004/0243622 A1 | 12/2004 | Morisawa | |
| 2005/0010863 A1 | 1/2005 | Zernik | |
| 2005/0060643 A1 | 3/2005 | Glass et al. | |
| 2005/0138382 A1 | 6/2005 | Hougaard et al. | |
| 2005/0183039 A1 | 8/2005 | Revis | |
| 2005/0246193 A1 | 11/2005 | Roever et al. | |
| 2006/0085766 A1 | 4/2006 | Dominowska et al. | |
| 2006/0095336 A1 | 5/2006 | Heckerman et al. | |
| 2006/0122889 A1 | 6/2006 | Burdick et al. | |
| 2006/0168510 A1 | 7/2006 | Bryar et al. | |
| 2006/0184421 A1 | 8/2006 | Lipsky et al. | |
| 2006/0212509 A1* | 9/2006 | Feigenbaum et al. | 709/201 |
| 2006/0248442 A1 | 11/2006 | Rosenstein et al. | |
| 2006/0277167 A1 | 12/2006 | Gross et al. | |
| 2006/0294461 A1 | 12/2006 | Nadamoto et al. | |
| 2007/0022072 A1 | 1/2007 | Kao et al. | |
| 2007/0027672 A1 | 2/2007 | Decary et al. | |
| 2007/0094241 A1 | 4/2007 | M. Blackwell et al. | |
| 2007/0124693 A1 | 5/2007 | Dominowska et al. | |
| 2007/0139430 A1 | 6/2007 | Korn et al. | |
| 2007/0240160 A1 | 10/2007 | Paterson-Jones et al. | |
| 2007/0288589 A1 | 12/2007 | Chen et al. | |
| 2008/0028334 A1 | 1/2008 | De Mes | |
| 2008/0104502 A1 | 5/2008 | Olston | |
| 2008/0183672 A1 | 7/2008 | Canon et al. | |
| 2008/0184128 A1 | 7/2008 | Swenson et al. | |
| 2008/0320225 A1 | 12/2008 | Panzer et al. | |
| 2009/0012969 A1 | 1/2009 | Rail et al. | |
| 2009/0164924 A1 | 6/2009 | Flake et al. | |
| 2009/0204478 A1 | 8/2009 | Kaib et al. | |
| 2009/0217199 A1 | 8/2009 | Hara et al. | |
| 2009/0248680 A1 | 10/2009 | Kalavade | |
| 2009/0254867 A1 | 10/2009 | Farouki et al. | |
| 2009/0282021 A1 | 11/2009 | Bennett | |
| 2009/0287698 A1 | 11/2009 | Marmaros et al. | |
| 2009/0327914 A1 | 12/2009 | Adar et al. | |
| 2010/0036740 A1 | 2/2010 | Barashi | |
| 2010/0057639 A1 | 3/2010 | Schwarz et al. | |
| 2010/0125507 A1 | 5/2010 | Tarantino, Iii et al. | |
| 2010/0131594 A1 | 5/2010 | Kashimoto | |
| 2010/0138293 A1 | 6/2010 | Ramer et al. | |
| 2010/0218106 A1 | 8/2010 | Chen et al. | |
| 2010/0278453 A1* | 11/2010 | King | 382/321 |
| 2010/0293190 A1 | 11/2010 | Kaiser et al. | |
| 2010/0312788 A1 | 12/2010 | Bailey | |
| 2010/0318892 A1 | 12/2010 | Teevan et al. | |
| 2010/0332513 A1 | 12/2010 | Azar et al. | |
| 2011/0022957 A1 | 1/2011 | Lee | |
| 2011/0029854 A1 | 2/2011 | Nashi et al. | |
| 2011/0055203 A1 | 3/2011 | Gutt et al. | |
| 2011/0078140 A1 | 3/2011 | Dube et al. | |
| 2011/0078705 A1 | 3/2011 | Maclinovsky et al. | |
| 2011/0119661 A1 | 5/2011 | Agrawal et al. | |
| 2011/0161849 A1 | 6/2011 | Stallings et al. | |
| 2011/0173177 A1 | 7/2011 | Junqueira et al. | |
| 2011/0173637 A1 | 7/2011 | Brandwine et al. | |
| 2011/0178868 A1 | 7/2011 | Garg et al. | |
| 2011/0185025 A1 | 7/2011 | Cherukuri et al. | |
| 2011/0191327 A1 | 8/2011 | Lee | |
| 2011/0197121 A1 | 8/2011 | Kletter | |
| 2011/0246873 A1 | 10/2011 | Tolle et al. | |
| 2011/0264649 A1* | 10/2011 | Hsiao et al. | 707/722 |
| 2011/0289074 A1 | 11/2011 | Leban | |
| 2011/0296341 A1 | 12/2011 | Koppert | |
| 2011/0302510 A1 | 12/2011 | Harrison et al. | |
| 2012/0005276 A1* | 1/2012 | Guo et al. | 709/206 |
| 2012/0072821 A1 | 3/2012 | Bowling | |
| 2012/0084644 A1 | 4/2012 | Robert et al. | |
| 2012/0096365 A1 | 4/2012 | Wilkinson et al. | |
| 2012/0110017 A1 | 5/2012 | Gu et al. | |
| 2012/0137201 A1 | 5/2012 | White et al. | |
| 2012/0143944 A1 | 6/2012 | Reeves et al. | |
| 2012/0150844 A1 | 6/2012 | Lindahl et al. | |
| 2012/0166922 A1 | 6/2012 | Rolles | |
| 2012/0198516 A1 | 8/2012 | Lim | |
| 2012/0215834 A1 | 8/2012 | Chen et al. | |
| 2012/0215919 A1 | 8/2012 | Labat et al. | |
| 2012/0284629 A1 | 11/2012 | Peters et al. | |
| 2012/0317295 A1 | 12/2012 | Baird et al. | |
| 2012/0331406 A1 | 12/2012 | Baird et al. | |
| 2013/0007101 A1 | 1/2013 | Trahan et al. | |
| 2013/0007102 A1 | 1/2013 | Trahan et al. | |
| 2013/0031461 A1 | 1/2013 | Hou et al. | |
| 2013/0073388 A1* | 3/2013 | Heath | 705/14.53 |
| 2013/0080611 A1 | 3/2013 | Li et al. | |
| 2013/0111579 A1* | 5/2013 | Newman et al. | 726/17 |
| 2013/0198641 A1 | 8/2013 | Brownlow et al. | |
| 2014/0006129 A1* | 1/2014 | Heath, Stephan | 705/14.23 |

OTHER PUBLICATIONS

Chen, H., et al., "Bringing Order to the Web: Automatically Categorizing Search Results," Proceedings of the SIGCHI Conference on Human Factors in Computing Systems, Apr. 1-6, 2000, pp. 145-152.
Rao, H.C.-H.,et al., "A Proxy-Based Personal Web Archiving Service," Operating Systems Review, 35(1):61-72, 2001.
Teevan, J., et al., "Changing How People View Changes on the Web," 2009, Proceedings of the 22$^{nd}$ Annual ACM Symposium on User Interface Software and Technology, New York, 2009, pp. 237-246.
Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.
De Carvalho, L.G., et al., Synchronizing Web Browsing Data With Browserver, Proceedings of the IEEE Symposium on Computers and Communications, Jun. 22-25, 2010, Riccione, Italy, pp. 738-743.
Bango, Rey "How JS & Ajax work in Opera Mini 4", Nov. 2, 2007, XP055050107, Retrieved from the Internet.
Brinkmann, M, "Record and Share your browser history with Hooeey," ghacks.net, Feb. 26, 2008, 6 pages, printed on Jan. 25, 2013.
Considine, A, "The Footprints of Web Feet," The New York Times, Mar. 4, 2011, 3 pages, printed on Jan. 25, 2013.

(56) References Cited

OTHER PUBLICATIONS

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber et al., "How to Make Personalized Web Browsing Simple, Secure, and Anonymous," Financial Cryptography, 16 pages (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/Tech/computing/9910/18/r.u.sure/index.html, 3 pages.

Van Kleek, M, Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

Web page titled "What Internet Users Do on a Typical Day, Trend Data (Adults), Pew Internet & American Life Project," printed from http://pewinternet.org/Static-pp./Trend-Data-(Adults)/Online-Activities-Daily.aspx on Nov. 29, 2012, 4 pages.

\* cited by examiner

AUTOMATED CONTENT UPDATE NOTIFICATION

BACKGROUND

Computing devices, such as personal computers, tablet computers, mobile phones, or other devices, often request content from other computing devices over a network. In a common application, the computing device operated by a requesting user is referred to as the client, and the computing device or system operated by the content provider that responds to the request is the server. A client and server may communicate over an intranet, the Internet, or any other communication network.

Clients receive and process content (e.g., web pages) from content servers. In many cases, the requested content changes over a period of time, or from request to request. Changes at the content server may not be reflected in copies of content previously received by clients. Clients may receive the changes by again requesting and receiving the content from the content server.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to detecting meaningful updates to network accessible content, including but not limited to web pages. Specifically, the disclosure relates to automatically determining which portion or portions of a content page, document, or other unit of content are important, interesting, or meaningful. The determination can be based on a previously defined content profile, on an analysis of user interactions with the content, on algorithms and automated content analysis techniques, or some combination thereof. For example, user zooming and clicking behaviors may be tracked, and patterns may be detected in user interaction data received from a number of different users. The patterns may indicate which portion or portions are meaningful, such as news headlines, and which are not, such as advertisements. Notifications may be transmitted when changes occur to such meaningful portions.

Additional aspects of the disclosure relate to monitoring the content and determining whether and to what extent the content of the meaningful portion(s) has changed. For example, minor changes such as typo corrections or formatting changes may not be important or meaningful, while substantive changes such as the addition of new content or the modification of more than a threshold amount of previously accessed content may be meaningful.

Further aspects of the disclosure relate to notifying users of detected meaningful content updates. Notifications can include current versions of the content, or may be limited to only the updated portions of the content. The updated content may be displayed to the user on a client device, and visual treatments, such as flashing, highlighting, outlining, redlining, etc. may be applied to the updated portions to draw the user's attention to the presence and substance of the updates. In some cases, a new tab may be automatically opened in a tab-based browser interface. The new tab may contain the content page for which a meaningful update has been detected. The new tab (or an existing tab which displays a page that has changed) may blink or be colored differently to draw the user's attention to it. Updates made to the non-meaningful portions of a page, even if significant in quantity, preferably do not give rise to transmissions of update notifications; thus, users are not burdened with notifications regarding changes of little importance.

The disclosed system may also be capable of providing personalized update notifications to a user based on the user's explicit indication—and/or an automated assessment—of what portion(s) of a content page are important (or unimportant) to the user. For example, the system may include a browser component that enables the user to explicitly select a portion of a content page (e.g., by drawing a border around it) and to ask to receive notifications of changes to that portion. (The user may also have the option to designate a particular portion as unimportant.) As another example, the system may analyze a particular user's interaction with a content page to determine which portion(s) are important to that user, and may then use this information to send personalized update notifications to this user.

Although aspects of the embodiments described in the disclosure will focus, for the purpose of illustration, on relationships and interactions between client devices and content providers through an intermediary system, one skilled in the art will appreciate that the techniques disclosed herein may be applied to any number of hardware or software processes or applications. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

Content Delivery Environment

Figure 1:
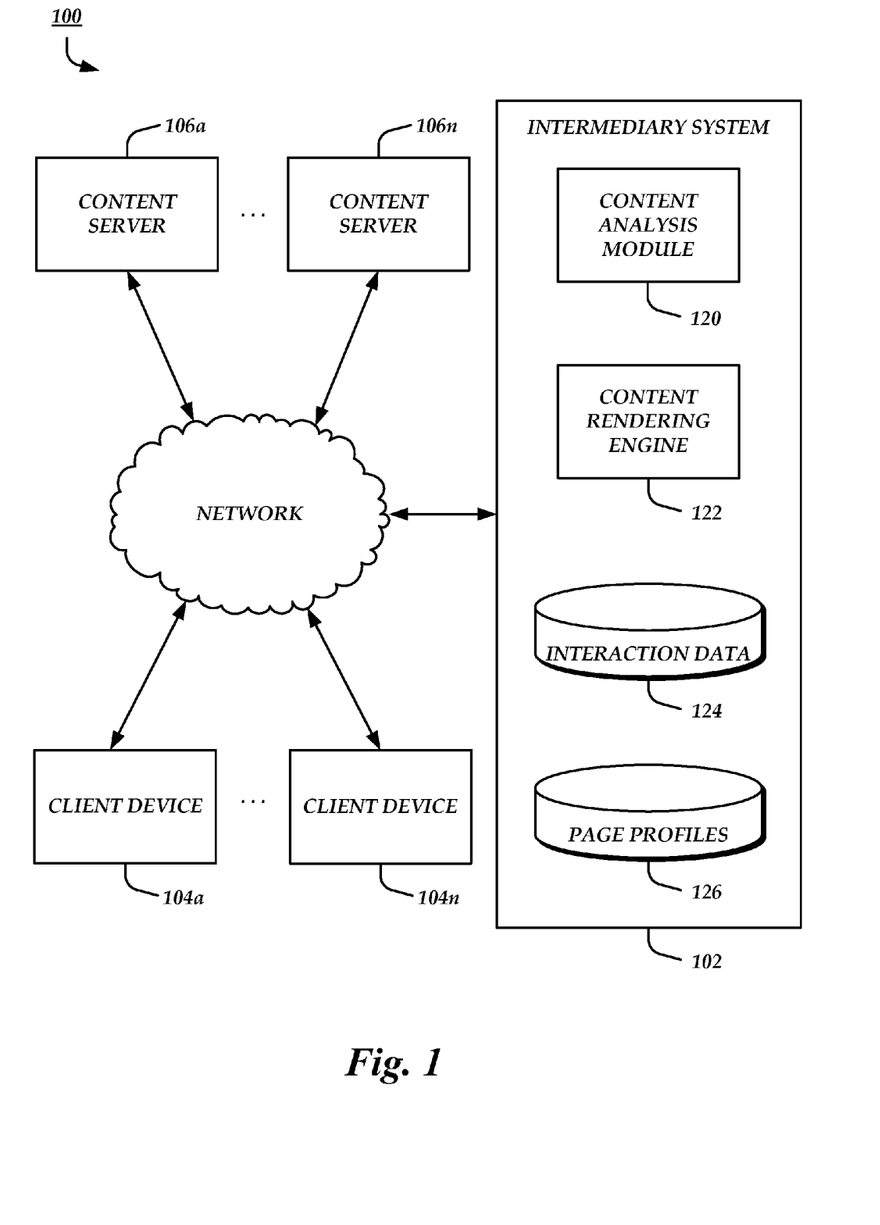
FIG. 1 is a block diagram of an illustrative content delivery environment including multiple client devices, an intermediary system, and multiple content providers.

FIG. 1 illustrates an example content delivery environment 100 in which automated detection of meaningful content updates may be implemented. In some embodiments, the content may include content pages, such as web pages and other documents. The content pages may include any combination of text, images, videos, animations, interactive features, and the like.

A content delivery environment 100 can include an intermediary system 102, any number of client devices 104a-104n, and any number of content servers 106a-106n. The various systems may communicate with each other via a communication network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The intermediary system 102 can be any computing system that serves as an intermediary between a client device 102 and content servers 106. For example, the intermediary system 102 can be an intelligent proxy server, a system operated by an internet service provider (ISP), or some other device or group of devices that retrieve content on behalf of client devices 104. Illustratively, the intermediary system 102 of FIG. 1 is configured to serve as a proxy between client devices 104 and content servers 106. The intermediary system 102 can include a number of components, such as a content analysis module 120, a content rendering engine 122, an interaction data store 124, and a page profile data store 126. In some embodiments, the intermediary system 102 may include additional or fewer components than illustrated in FIG. 1. For example, the intermediary system 102 may not include a content rendering engine 122, or may include or otherwise be associated with various additional computing resources, such as content delivery network (CDN) systems, domain name system (DSN) servers, and the like.

The intermediary system 102 may include multiple computing devices, such as computer servers, logically or physically grouped together. The components of the intermediary system 102 can each be implemented as hardware, such as a server computing device, or as a combination of hardware and software. In addition, the components of the intermediary system 102 can be combined on one server computing device or separated individually or into groups on several server computing devices. In some embodiments, the intermediary system 102 can include multiple instances of a single component, etc.

The client devices 104*a*-104*n* can correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. A client device 104 may be configured with a browser application to communicate via the network 110 with other computing systems, such the intermediary system 102 or content servers 106, and to request, receive, process, and display content.

The content server 106 can correspond to a logical association of one or more computing devices for hosting content and servicing requests for the hosted content over the network 112. For example, the content server 106 can include a web server component corresponding to one or more server computing devices for obtaining and processing requests for content (such as content pages) from the client device 102, the intermediary system 104, or other devices or service providers. In some embodiments, one or more content servers 106 may be associated with a CDN service provider, an application service provider, etc.

In operation, one or more client computing devices 104*a*-104*n* may be associated with an intermediary system 102. For example, a client computing device 104 may utilize proxy and caching services provided by the intermediary system 102. A user of the client device 104 may initialize a browser application and transmit a request for a content page, such as a web page. Due to the association with the intermediary system 102, the request may be transmitted to the intermediary system 102 rather than directly to the content server 106 of the content page. The intermediary system 102 can retrieve the content page from a content server 106 or some other source of the content page, such as a CDN system. The intermediary system 102 may process the content page prior to transmitting it to the client device 104. For example, the intermediary system 102 may utilize the content rendering engine 122 to partially or completely render the page. The rendered content may then be transmitted to the client device 104. In some embodiments, the content rendering engine 122 may be in communication with a browser application on the client device 104, such that processing from the content rendering engine 122 is automatically reflected at the browser of the client device 104. One example of a content rendering engine 122 executing on an intermediary system 102 or other network computing component, and the browsing configurations and processing that facilitate usage of the content rendering engine 122, is described in U.S. patent application Ser. No. 13/174,589, the disclosure of which is hereby incorporated by reference.

The intermediary system 102 may utilize the content analysis module 120 to analyze the content page and create a profile of the page. The profile may include information such as the source, structure, subject matter, and other characteristics associated with the content page. The profile may be stored in the page profile data store 126. As described in detail below, the content analysis module 120 can utilize various algorithms, computer-learning techniques, historical data associated with the content page, and data received from the current client device 104 to determine, among other things, which portion or portions of the content page are important or otherwise of interest to a user. Such meaningful portions of the content page may then be monitored for changes on behalf of the current client device 104. When a change is detected, the content analysis module 120 may determine whether the change is important or otherwise of interest. Factors to consider when making such a determination include the amount of the content page or meaningful portion thereof which has changed (e.g.: an entire article vs. a typo correction), or the nature of the change (e.g.: additional content has been added vs. a formatting change).

In some embodiments, the system 120 may also store user-specific page profiles that indicate, for particular users and pages, which portions of the pages are important to such users. These indications may be based on explicit selections of the users (e.g., a user explicitly designates a portion of a page to be monitored for updates by drawing a border around it), and/or be based on the monitored interactions of such users with the subject pages.

In some cases, a content page may change substantially over a short period of time, or even every time the page is retrieved. Such pages may not be good candidates for the content analysis and update notification methods described herein. In addition, the dynamic nature of the content may indicate that any individual change to the content is not meaningful. Accordingly, content or portions of content which exhibit a high rate of change may be excluded from update monitoring, or notifications regarding changes to such dynamic pages may be suppressed.

As will be apparent, the content notification features described herein can also be implemented without the use of a proxy server or other intermediary system 102. For example, a browser can be designed or configured to communicate with a designated (non-intermediary) update notification server that supplies information to client devices regarding updates made to particular sites or pages. In such embodiments, a browser may automatically subscribe, based on the user's browsing patterns, to receive notifications from the update notification server regarding particular sites, URLs, or ranges of URLs. The browser may in turn use these notifications to display (or display notifications of) these updates. As another example, and as described in more detail below, the disclosed features for detecting meaningful changes to pages can be implemented entirely within a browser or other client component that runs on the user's device.

Content Retrieval and Update Interactions

Figure 2:
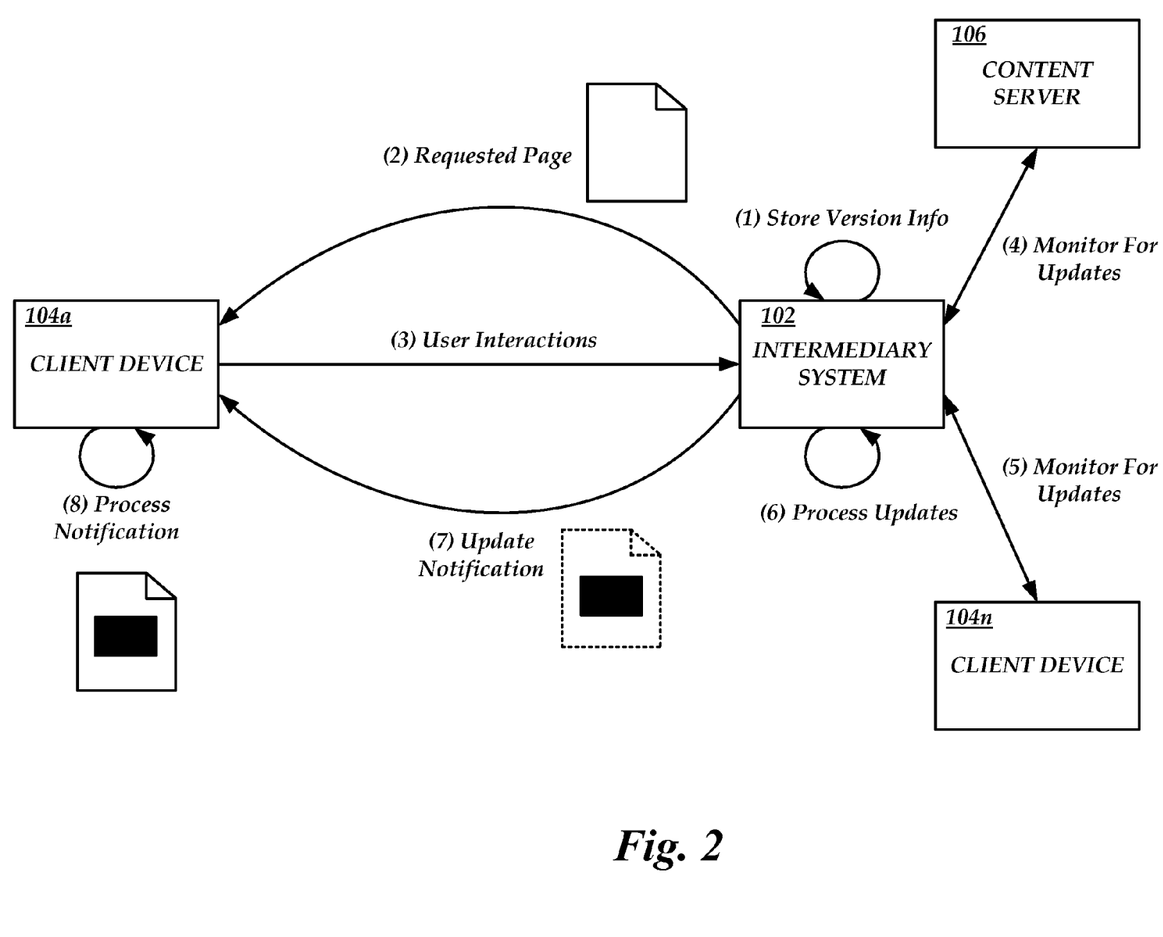
FIG. 2 is a block diagram of illustrative communications and data flows between a client device, an intermediary system, and a content provider.

FIG. 2 illustrates interactions and data flows between a client device 104a and an intermediary system 102 in response to a request, transmitted from the client device 104a, for a web page. The intermediary system 102 may retrieve a requested content page from a source of the content page, such as the content server 106 which hosts the page, and store a snapshot or some other version information about the current version of the page at (1). The version information may include, for example, the output of a checksum or hashing function performed on the retrieved version of the content page or its meaningful portions. The version information can be stored in the page profile data store 126 with an indication of which client device 104 or user thereof requested the page, when the page was retrieved, etc.

In some embodiments, the version information may be more descriptive of the current version of the content page or portions thereof. For example, a page profile associated with the content page may include data regarding which portions of the page are meaningful. The meaningful portions may be automatically determined based on an analysis of user interactions or based on other techniques. In some embodiments, the meaningful portions may be defined by users. Snapshots of the meaningful portions or version information regarding the meaningful portions may be saved to facilitate detection of meaningful changes. Accordingly, client devices 104a-104n or users thereof may be notified of or otherwise provided with access to changes to the meaningful portions of the content page in comparison with the last version of the content page that the client device 104 requested.

In some embodiments, snapshots of the content page or portions thereof may be stored in a shared cache, or version information may be stored such that changes are detected with respect to the content page as it is presented to a group of client devices 104a-104n, rather than changes with respect to versions retrieved for and transmitted to any particular client device 104. In these embodiments, a client device 104 or a user thereof may access the most recent meaningful changes to the content page even if the client device 104 has never requested content page. In addition, a client device 104 may be enabled to access the most recent meaningful changes to the content page even in cases where a substantial period of time has passed since the last time the client device 104 requested the content page, such that all or substantially all of content page has changed.

The requested content page can be transmitted to the client device 104a at (2), subsequent to saving the snapshot or version information as described above. In some embodiments, the transmission of the requested content page to the client device 104a may occur prior to or substantially simultaneously with storing the version information.

The client device 104a can transmit interaction data regarding interactions with the content page at (3). A user of the client device 104a may click, scroll, zoom, pan, or otherwise interact with the content page. Such interactions may be used by the content analysis module 120 to determine which portion or portions of the page are meaningful. In some embodiments, the user may specify which portion or portions are meaningful. Interaction data regarding these and other interactions may be transmitted as the interactions occur, or the interaction data may be stored for future transmission, such as on a schedule, when the client device 104a is idle, when the browsing session is terminated, etc.

The intermediary system 102 can monitor for changes to the content page at (4). For example, the intermediary system 102 can periodically or randomly retrieve the content page from the content server 106 or some other content source and determine whether and to what extent the content page has changed. Alternatively, or in addition, the intermediary system 102 may check for changes to the content page when retrieving the content page in response to a request from another client computing device 104n for the content page at (5). For example, the intermediary system 102 may compare each version of the content page, retrieved for client device 104n, to the version retrieved for and transmitted to the client device 104a at (1), above, or to the most recent version that was retrieved for any requesting client device 104a-104n, such as a version stored in a shared cache. As described above, some pages or content portions exhibit a high rate of change. Comparing two versions of these types of content may, in a substantial percentage of cases, indicate that a change has occurred. Accordingly, highly dynamic pages may be excluded from the automatic update detection process.

In response to determining that content page or some portion thereof has changed, as described in detail below with respect to FIG. 3, the intermediary system 102 may process the changes at (6). Such processing may include rendering the new version, or only the modified portion, in the content rendering engine 122. Additional processing may include applying visual treatments to bring the user's attention to the changes, such as by adding redlines, highlights, and the like.

The intermediary system 102 can transmit a notification to the client device 104a at (7) along with the current version of the content page or an updated portion thereof. For example, the intermediary system 102 may make a Hypertext Transfer Protocol (HTTP) transmission to the client device 104a. The HTTP transmission may include Hypertext Markup Language (HTML) code corresponding to a modified portion of a web page previously received by the client device 104a (e.g.: at (1)). In addition, HTTP headers may be included in the transmission indicating which area of the previously accessed version of the web page to replace with the included HTML code, what type of notification or alert to trigger on the client device 104a, and the like. Alternatively, the intermediary system 102 could transparently send to the browser a separate "page information file" or "update information file" containing information about the updates made to the page.

In some embodiments, the current version of the content page is not processed by the intermediary system 102 at (6). In such cases, an unmodified copy of the current content page may be transmitted to the client device 104a at (7). The intermediary system 102 may include metadata in the transmission indicating which portion of the page has changed, which visual treatments if any to apply to the changed portion, which notification or alert to trigger on the client device 104a, etc. Such metadata may be transmitted via HTTP headers, as described above, or through some other technique.

The client device 104a can, upon receipt of the transmission at (7) from the intermediary system 102, process the transmission at (8). Processing the transmission may include inspecting HTTP headers, if present, to determine the nature of the transmission. The transmission may include a complete copy of the updated resource, such as an HTML file of a web page, or it may include only the changed portion. As shown in FIG. 2, if only the modified portion is included, it can be merged into the previous version of the content page stored on the client device 104*a*. For example, the HTTP headers may indicate which portion of the previous HTML file to replace with the updated portion. An HTTP header may indicate screen coordinates or an HTML tag, such as a <DIV> tag, to replace with the content that follows the HTTP headers. If the portion to be replaced is identified by screen coordinates, then the browser of the client device 104*a* may render the previously received version of the content page, locate the screen coordinates corresponding to the portion to be replaced, and substitute a rendered copy of the updated portion. If the portion to be replaced is identified by an HTML tag, the browser application can access the previously received version of the content page, locate the HTML tag or other indicator of portion to be replaced, and substitute the HTML code corresponding to the updated portion.

Visual Treatments to Updated Content

A browser application on the client device 104 may be configured to receive notifications from an intermediary server 102 or from a separate content update detection service. The browser may receive update notifications and process those update notifications for display to a user. In some embodiments, a separate component of the client device 104 may receive update notifications. For example, a toolbar or plugin to the browser application may receive update notifications via the network connection of the client device 102 and display notifications or cause the browse application to display notifications.

The client device 104 may display the updated content page to the user in various ways. In some embodiments, the browser application can launch a new tab if the tab corresponding to the previously received content page has been closed. FIG. 3 illustrates a sample tab-based user interface 300 of a browser application with a tab 302 corresponding to an updated version of a content page. As shown in FIG. 3, the tab may be launched in the background so as not to interfere with the current browsing session in tab 304. In order to alert the user that the update has been received, the new tab 302 may blink, be displayed as a different color, or have other visual treatments applied. A tab that is already open within the browser can similarly be highlighted to indicate the availability of a meaningful update.

In some embodiments, the browser application may highlight, blink, change the color, or apply other visual treatments to a link to a page with updated content. The user interface 300 of FIG. 3 illustrates a bookmarks menu 306 with a link 308 that is highlighted to indicate to the user that the page associated with the link has been updated. A user may access the bookmarks menu 306 to quickly see which of the bookmarked pages have changed.

Figure 3:
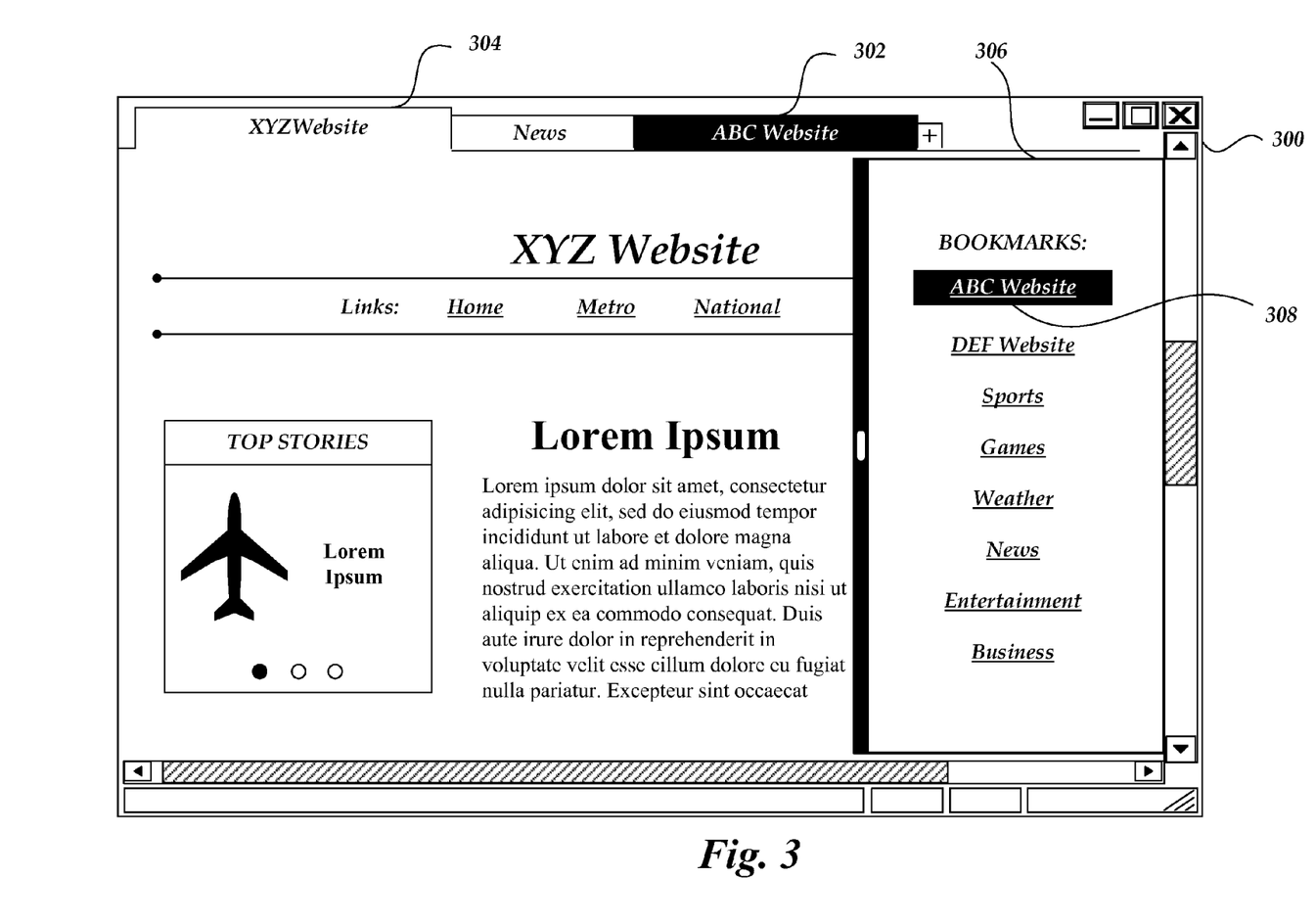
FIG. 3 is a user interface diagram of illustrative interactions between a user and content which can indicate that a portion of the content is meaningful.
Figure 4:
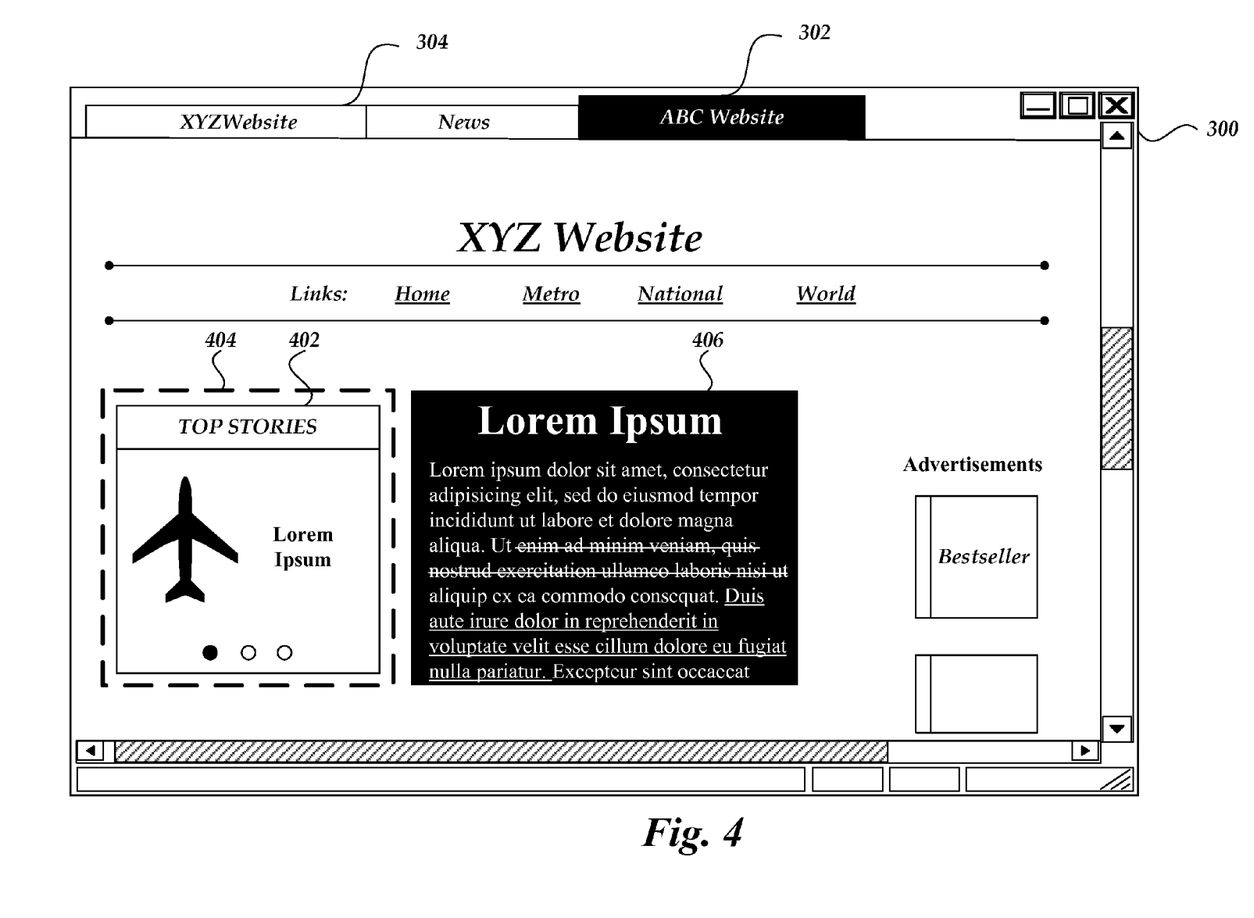
FIG. 4 is a user interface diagram of illustrative notifications that a content page has been meaningfully updated.

FIG. 4 illustrates the user interface 300 of FIG. 3 displaying the updated content associated with tab 302. The updated content portions shown in FIG. 4 are indicated in various ways. In practice, a single method of identifying updated content may be chosen for consistency. Alternatively, multiple methods of identifying updated content may be used to indicate that particular content has been updated differently.

Content portion 402 is outlined 404 to set it apart from the rest of the content page rendered in the user interface 400, while content portion 406 is highlighted. Content portion 406 also includes both the original text and the current version of the text, similar to a redline edit view in a word processing document. Other visual treatments are possible, such as hovering text (e.g.: tooltips), popup boxes, and the like. In some embodiments, two or more changes to the same portion of a content page may be presented to the user as a series of slides or as an animation embedded into the content page.

Content Update Detection Process

Figure 5:
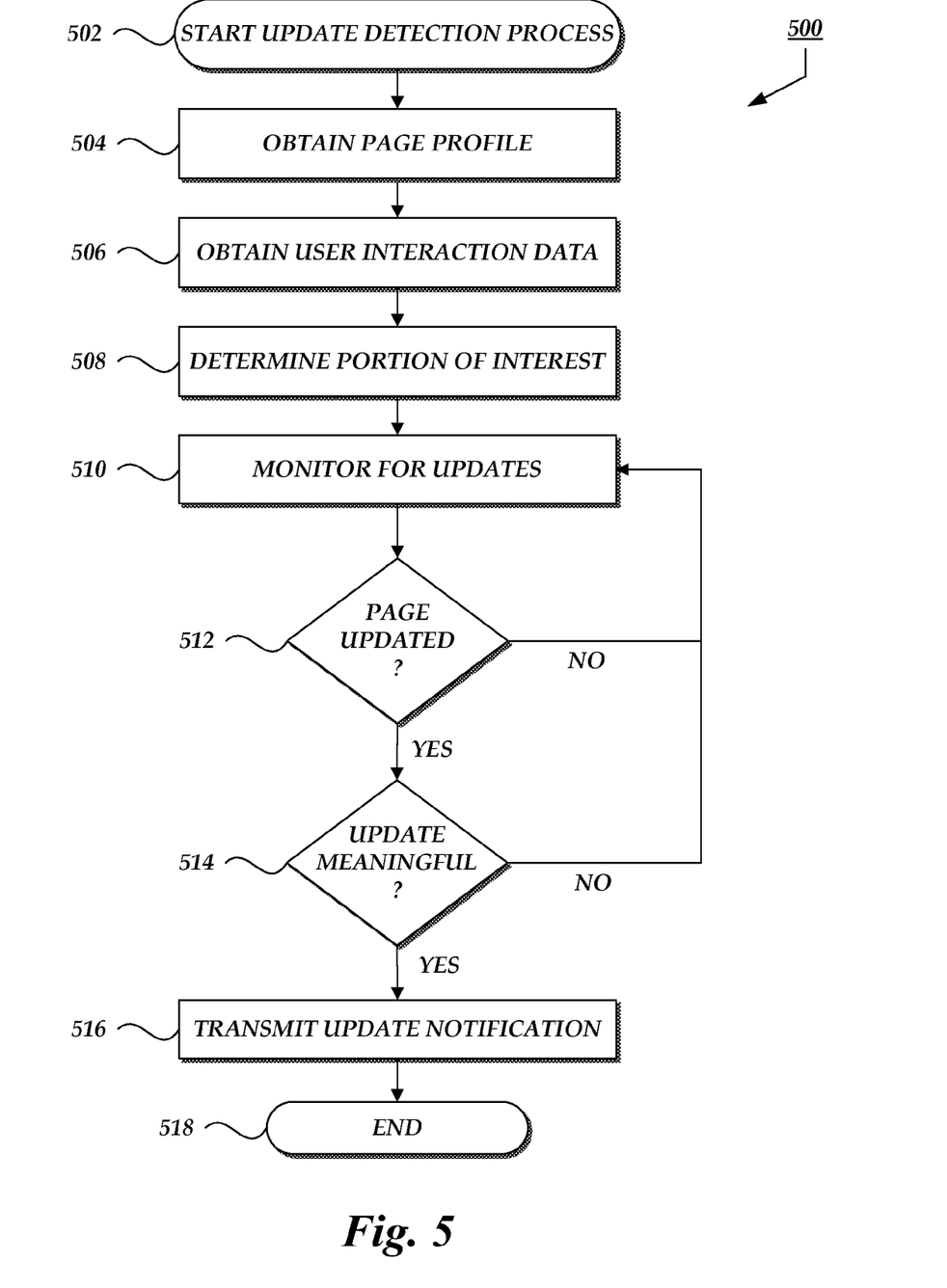
FIG. 5 is a flow diagram of an illustrative process for automatically determining meaningful content updates.

Turning now to FIG. 5, an illustrative process 500 for determining which portions of a content page are meaningful and for detecting meaningful changes to those portions will be described. The process 500 may be executed by the content analysis module 120 or some other component of the intermediary system 102 (or by a non-intermediary update notification server). The content analysis module 120 can determine which portion or portions of a content page are interesting, important, or otherwise meaningful by analyzing user interactions with the content page, receiving input from users indicating that a portion is meaningful, and applying various algorithms and machine learning techniques to a content page. In some embodiments, the content analysis module 120 may determine which portion or portions are not meaningful, and thereby infer that some or all of the remaining portions are meaningful. The remaining portions may be analyzed with respect to user interactions and the like, as described herein.

For example, the content analysis module 120 may determine that a portion is not meaningful if: it consists primarily of advertising, as determined by analyzing web page content and coding; it changes very frequently over time; it contains one or more links that are rarely selected by users in comparison to other portions of the page; it is rarely the focus of users' attention, as determined by monitoring panning and zooming behaviors of users of touch screen devices and/or by monitoring page scrolling actions; or if it is clipped, shared or otherwise marked as interesting significantly less frequently than other portions of the page by users of a content clipping service, social network sharing service, or some similar system.

The content analysis module 120 can monitor the content page to determine whether it has changed. Advantageously, when a change is detected with respect to a meaningful portion of the content page, the content analysis module 120 can determine whether the extent of the change is enough to warrant taking further action, such as processing the changed portion and notifying users of the change.

The process 500 begins at block 502. The process 500 may begin automatically, such as in response to the receipt, by the intermediary system 102, of a request from a client device 104 for a content page. In some embodiments, the process 500 may be initialized in response to the beginning of a browsing session by a client device 104. For example, a client device 104 may initialize a browsing session, and the content analysis module 120 may be employed to determine whether there are any updates to pages associated with a bookmark on the client device, to pages which the client device 104 requests frequently, etc.

The process 500 may be embodied in a set of executable program instructions and stored on a computer-readable medium drive of the computing system with which the content analysis module 120 is associated. When the process 500 is initiated, the executable program instructions can be loaded into memory, such as RAM, and executed by one or more processors of the computing system. In some embodiments, the computing system may include multiple computing devices, such as servers, and the process 500 may be executed by multiple servers, serially or in parallel.

At block 504, the content analysis module 120 can obtain a profile for the content page that is the subject of analysis, if a profile exists. The page profile may contain data that indicates which portion or portions of the page are meaningful, whether there is a regular update schedule, whether there is a threshold for the extent of a change to a content portion that is to be met or exceeded before a notification is issued, and other data. The page profile may be loaded from a page profile data store 126 of the intermediary system 102 or obtained from some other source. In some cases, such as the first time a page has been requested by any client device 104 associated with the intermediary system 102, there may not be a profile for the content page.

At block 506, the content analysis module 120 can obtain additional data to aid in determining which portions of the content page are meaningful. The additional data may include user interaction data, such as data reflecting clicking, scrolling, zooming, and panning behaviors performed by users when viewing the content page. In some embodiments, such as when the computing device 104 is configured with a user-facing camera, data regarding user eye movements may be used. User interaction data may be recorded by a browser or other component of the client device 104 while a user is browsing a content page, and such data may be transferred to the intermediary system 102 and stored in the user interaction data store 124.

Figure 6:
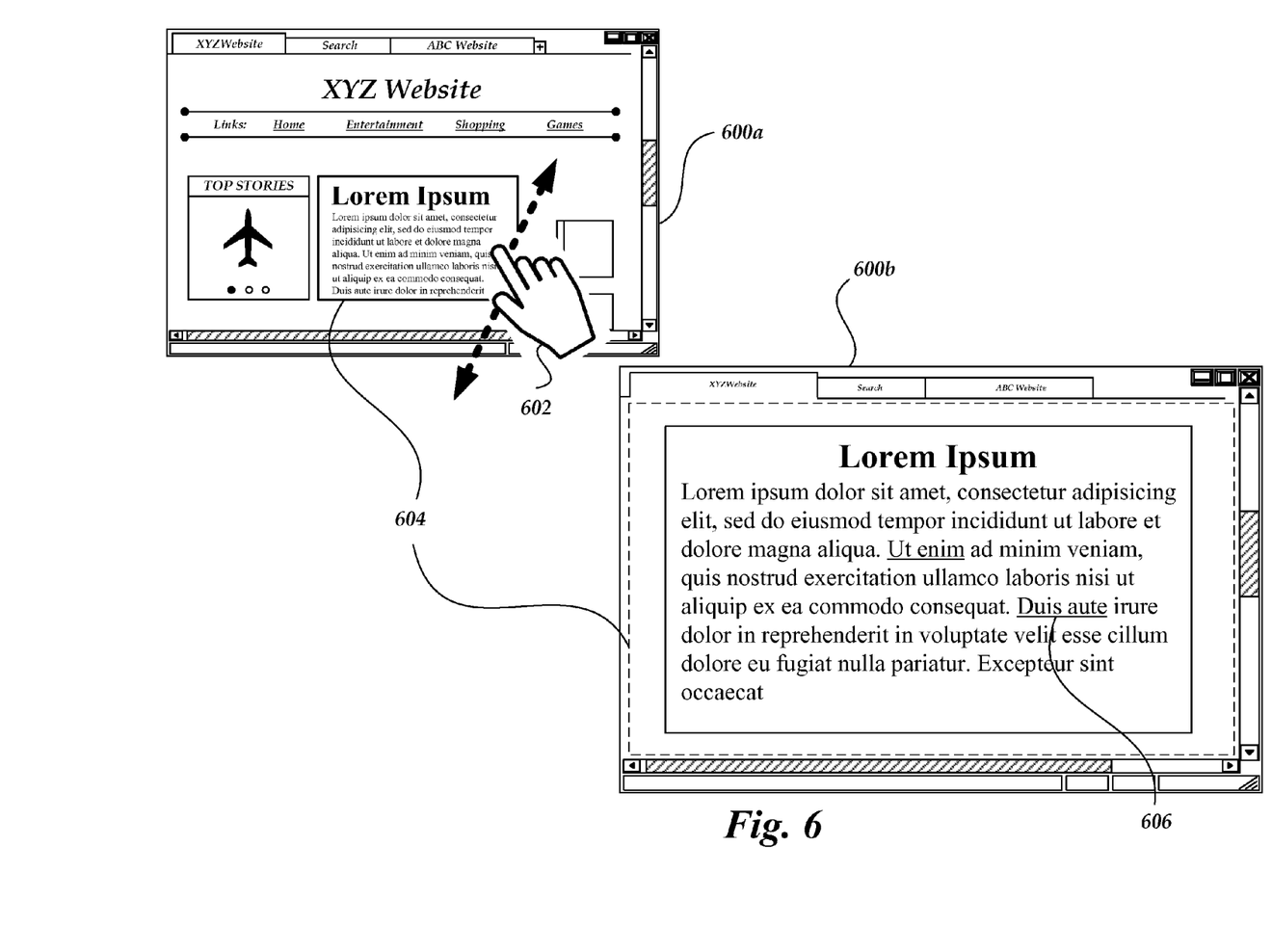
FIG. 6 is a user interface diagram of illustrative visual treatments indicating which portions of a content page have been meaningful updated.

FIG. 6 illustrates touch screen user interface 600*a* displaying a content page. A user 602 may perform a zooming gesture in order to focus the display on a content portion 604. Data regarding the area visible in zoomed display 600*b*, shown in FIG. 6 as roughly corresponding to the border of content portion 604, can be transmitted by the browser to the intermediary system 102 and stored in a user interaction data store 124 or some other data store. For example, screen coordinates, snapshots, or HTML tags (e.g.: <DIV> or <TABLE> tags) that correspond to the visible area may be transmitted. The content portion 604 visible in the zoomed display 600*b* may be a meaningful content portion, and the content analysis module 120 can update the page profile to reflect that. Link activations may also indicate that a content portion containing the links is meaningful. Accordingly, data regarding link activations may be recorded. For example, data may be recorded when a user activates links in a content portion, such as link 606 in content portion 604. The link activation data may also be transmitted to the intermediary system 102 and stored in the user interaction data store 124 or some other data store. As described above, other user interactions may also be tracked.

At block 508, the content analysis module 120 can determine which content portion or portions of a content page may contain meaningful content. As described above, a page profile may specify which portions are meaningful. The content analysis module 120 may rely on such specifications or perform further analysis to confirm or supplement the profile. The further analysis may be based on user interaction data, obtained above in block 506. The content analysis module 120 may detect a pattern in the user interaction data, such as a large percentage of users clicking one of several links in a content portion, or a number, exceeding a threshold, of users that zoom in on a content portion, etc. Such patterns may indicate new meaningful content portions or confirm those specified in the page profile. The content analysis module 120 may also detect patterns or perform other analyses which contradict the page profile. In such cases, the content analysis module 120 may modify the page profile and save it in the page profile data store 126.

In some embodiments, a user may specify which portion of a page is meaningful, and such personalized specifications can be stored with the page profile in the page profile data store 126, with other user interactions in the user interaction data store 124, or in some other data store. For example, a user may use the user interface 600 illustrated in FIG. 6 to zoom the display on a content portion and access a menu to indicate user interest in the content portion. In some embodiments, the content server 106 may specify which portions of a content page are meaningful, such as by embedding metadata into the content page.

At block 510, the content analysis module 120 can monitor for changes to the page. The content analyses module 120 can periodically retrieve the content page from the content provider 106, or monitor versions of the content page retrieved for other client devices 104 as described with respect to FIG. 2.

At decision block 512, the content analysis module 120 can determine whether the monitored content page has changed. The content analysis module 120 can compare the result of a checksum or hashing function performed on copies of the monitored content page, as received in block 508, against the result of the same function performed on a previously retrieved version of the content page. Other techniques may be used to determine whether a change has occurred. If the content analysis module 120 determines that the content page has changed, the process 500 may proceed to decision block 514. Otherwise, the process 500 can return to block 510 to continue monitoring.

At decision block 514, the content analysis module 120 or some other component of the intermediary system 102 can determine whether the changes to the monitored content page are meaningful. The determination can be based on a number of factors. Illustratively, the content analysis module 120 may first determine whether a changed portion of the content page is a meaningful portion, as described above. If a meaningful portion has been changed, the content analysis module 120 may then determine the nature of the change. For example, if the change was merely cosmetic, such as a formatting change, then the change may not be deemed to be meaningful and execution of the process 500 returns to block 510. However, if the change was substantive, such as a modification to a news article, then the change may be meaningful. In some embodiments, this determination may take into consideration information about the preferences of a particular user or class of users; thus, due to the different content preferences of different users, of given change may be treated as meaningful to some users but not others.

Changes to the text of an article may not be considered to be meaningful in some cases. For example, a typo correction may not be a meaningful change, while an addition or subtraction of a paragraph or an entire article may be meaningful. The content analysis module 120 may factor the extent of the change into the determination of whether the change is meaningful. For example, a top news article listing may typically include 10 links to articles. The addition or subtraction of one link, as may occur at regular intervals throughout the day, may not be a meaningful change; instead, the addition or subtraction of 25% of the links may be set as a threshold for meaningful change. For a different content page or a different content portion, even a small change may be meaningful. For example, a monitored content page may be updated only once per week. Any change to a meaningful portion of the page (e.g.: the body of the page, rather than the advertisements) may be considered to be meaningful, regardless of the extent of the change. If a change is determined to be a meaningful change, the process may proceed to block 516; otherwise, the process can return to block 510.

At block 516, a notification can be transmitted to one or more client devices 104 regarding the detected meaningful content change. As described above, the notification may include some or all of the current version of the monitored content page, and visual treatments may be associated with meaningfully changed portions. Accordingly, the client devices 104 need not request the current version of the content page from the intermediary system 102 or the content provider 106 in an effort to determine what has changed or to determine whether a change has occurred at all. Meaningful changes can be delivered to the client device 104 automatically, and in some case the updated portions may be pre-rendered by the content rendering engine of the intermediary system 102.

At block 518 the process 500 terminates. In some embodiments, the process 500 may return to block 510 to resume monitoring until the termination of a browsing session or the occurrence of some other triggering event.

Additional Embodiments

The disclosed content update detection/notification system can be varied in numerous ways. As one example, some or all of the disclosed functionality can be implemented on the client device within the browser or a browser plug-in. For example, while a user is viewing a page (or for a predetermined time period thereafter), the browser can, in the background, periodically retrieve the page and compare it to the version rendered to the user. (This comparison may be based on a locally-stored page profile which designates the portion(s) to be monitored for updates, as described above.) When a meaningful change is detected, the change can be called to the user's attention in any of the ways described above.

As another example, the system can be designed to additionally or alternatively send the update notifications to the users by email, text messages, personalized web pages (e.g., a personalized home page that provides an overview of significant changes made across a variety of distinct web sites), or any other communication method. In such embodiments, each update notification may include a user-selectable link to the updated page, which may be displayed in redline form relative to a previously viewed version.

As another example, the update notifications may be personalized for a user based on the type or types of devices used by that user. For instance, if the system detects that a Flash file on a page has changed, the system may refrain from sending a notification of this change to a particular user device based on a determination that the user device does not support Flash. If, however, the user of this device also uses a PC, the system may provide the update notification to the user on a PC (e.g., within a browser that runs on the PC).

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for detecting content changes, the system comprising:
   one or more processors;
   a computer-readable memory; and a module comprising executable instructions stored in the computer-readable memory, said module configured to provide change notifications that are dependent upon assessed levels of importance of changed content portions of pages, wherein the one or more processors are programmed by the module to at least:
  obtain a plurality of interaction records regarding user interactions with a content page, the content page comprising a plurality of content portions;
  identify an important portion of the plurality of content portions and an unimportant portion of the plurality of content portions based at least in part on the plurality of interaction records, wherein the module is configured to treat content portions identified as important differently from content portions identified as unimportant in providing change notifications to users;
  detect a change to the important portion based at least in part on a comparison of a current version of the content page and a previous version of the content page; and
  in response to detecting the change:
    determine an amount of the important portion that has changed; and
    in response to determining that the amount exceeds a threshold, transmit a change notification regarding the change.

2. The system of claim 1, wherein identifying the important portion of the content page comprises analyzing scrolling and zooming actions performed on the content page by a plurality of users.

3. The system of claim 1, wherein the one or more processors are further configured to:
  identify a second important portion of the plurality of portions based at least in part on the plurality of interaction records; and
  detect a change to the second important portion based at least in part on the comparison.

4. The system of claim 1, wherein the comparison of the current version to the previous version comprises comparing at least a checksum or hash of the current version to at least a checksum or hash of the previous version.

5. The system of claim 1, wherein the change notification comprises a copy of the important portion of the current version of the content page.

6. The system of claim 5, wherein the copy comprises a visual modification to the copy of the important portion.

7. The system of claim 1, wherein the plurality of interaction records are specific to a particular user, such that the identification of the important portion is personalized for the user.

8. A computer-implemented method for detecting content changes, the computer-implemented method comprising:
  obtaining a page profile associated with a content page hosted by a content server, the content page comprising a plurality of portions, wherein the page profile identifies a designated portion of the plurality of portions, said designated portion designated for monitoring of content updates, wherein at least some of the portions of the content page are not designated for monitoring of content updates, said designated portion designated for monitoring based on an automated determination that the designated portion is important to users relative to other portions of the content page;
  detecting, by a content update detection system comprising one or more computing devices, a change to the designated portion based at least in part on a comparison of a current version of the content page and a previous version of the content page, wherein the content update detection system is separate from the content server and is configured to use the page profile to determine which portions of the page to monitor for updates; and
  in response to detecting the change:
    determining whether an amount of the designated portion that has changed exceeds a threshold; and
    in response to determining the amount exceeds the threshold, transmitting a change notification regarding the change to a client computing device.

9. The computer-implemented method of claim 8, wherein the page profile identifies the designated portion with identification data comprising at least one of the following: coordinates of the important portion; a markup tag associated with the important portion, or an identifier associated with the important portion.

10. The computer-implemented method of claim 8 further comprising:
  obtaining a plurality of interaction records regarding user interactions with the content page; and
  determining the designated portion of the plurality of portions based at least in part on the plurality of interaction records.

11. The computer-implemented method of claim 10, wherein the user interactions include at least one of the following: zooming a display on the portion of the plurality of portions, activating a link within the portion of the plurality of portions, or scrolling the display to the portion of the plurality of portions.

12. The computer-implemented method of claim 11, wherein the user interactions include interactions of a plurality of users, and the method comprises assessing, based on the user interactions of the plurality of users, which portions of the page are important.

13. The computer-implemented method of claim 8, further comprising generating the page profile, wherein generating the page profile comprises programmatically assessing importance levels of each of the plurality of portions of the content page based on user interactions with the content page, including zooming and scrolling interactions.

14. The computer-implemented method of claim 8, further comprising determining the designated portion based on user interactions of a particular user with the content page, such that the change notification is personalized for the user.

15. The computer-implemented method of claim 8, wherein the page profile further identifies a second designated portion of the plurality of portions, the computer-implemented method further comprising:
  detecting a second change to the second designated portion based at least in part on the comparison; and
  in response to detecting the second change:
    determining whether an amount of the second designated portion that has changed exceeds a second threshold; and
    transmitting a notification regarding the second change to the client computing device.

16. The computer-implemented method of claim 8, further comprising monitoring the content page for changes, wherein the monitoring comprises periodically retrieving a copy of the content page from the content server.

17. A system for detecting content changes, the system comprising:
  one or more processors;
  a computer-readable memory; and
  a module comprising executable instructions stored in the computer-readable memory, said module configured to provide change notifications that are dependent upon assessed levels of importance of changed portions of content objects, wherein the one or more processors are programmed by the module to at least:

obtain profile data identifying a designated portion of a content object that comprises a plurality of portions, said designated portion designated for monitoring of content changes, said profile data also specifying an additional portion not to be monitored for content changes, said additional portion having an assessed importance level that is lower than an assessed importance level of the designated portion;

detect a change to the designated portion based at least in part on a comparison of data associated with a current version of the content object to data associated with a previous version of the content object; and in response to detecting the change:
determine whether an amount of the designated portion that has changed exceeds a threshold; and
in response to determining the amount exceeds the threshold, generate a notification regarding the change.

18. The system of claim 17, wherein the content object comprises one of a web page, an image, a video, an animation, or a network-accessible document.

19. The system of claim 17, wherein the profile data comprises at least one of the following: coordinates of the designated portion; a markup tag associated with the designated portion, or an identifier associated with the designated portion.

20. The system of claim 17, wherein the content object is hosted by a third party content server, and wherein the one or more processors are further configured to monitor the content object for changes, the monitoring comprising periodically retrieving a copy of the content object from the third party content server.

21. The system of claim 17, wherein the one or more processors are further configured to:
receive, from a plurality of client computing devices, requests for the content object;
in response to receiving a request, retrieve, from a third party content server, a copy of the content object, wherein the current version of the content object comprises the copy.

22. The system of claim 17, wherein the threshold comprises one of a percentage of the important portion or a count of elements associated with the designated portion.

23. Non-transitory computer storage comprising:
a page profile generator that generates a page profile which directly or indirectly specifies, for a particular network-accessible content page, at least a first content page portion to be monitored for generating content update notifications and a second content page portion to be disregarded for generating content update notifications, wherein the page profile generator generates the page profile at least partly by analyzing interaction records reflective of user interactions with the content page;
executable code which uses the page profile to determine whether particular changes to the content page should be called to the attention of at least one user, said executable code configured to detect changes made to the first content page portion, and to determine whether said changes satisfy a threshold for providing a change notification to the at least one user; and
a notification component that provides change notifications to the at least one user based on determinations made by the executable code.

24. The non-transitory computer storage of claim 23, wherein the page profile is based at least partly on monitored user interactions of a plurality of users with the content page.

25. The non-transitory computer storage of claim 23, wherein the page profile is based at least partly on an explicit designation by a user of a content page portion to be monitored or disregarded.

26. The non-transitory computer storage of claim 23, wherein the executable code determines whether changes to the content page should be called to the attention of the at least one user based at least in part on a characteristic of a user device associated with the at least one user.

27. The non-transitory computer storage of claim 23, wherein the executable code is a browser component that is configured to run on a user computing device.

28. The non-transitory computer storage of claim 23, wherein the page profile generator uses recorded user interactions with the content page to determine which portion or portions of the content page are relatively important to users.

29. The system of claim 17, wherein the one or more processors are programmed by the module to assess the importance levels of each of the plurality of portions of the content object at least partly by analyzing user interactions with the content object, including scrolling interactions.

* * * * *